United States Patent [19]

Alexander

[11] Patent Number: 4,492,014

[45] Date of Patent: Jan. 8, 1985

[54] JET ENGINE COMPRESSOR STAGE PULLER

[75] Inventor: Billy R. Alexander, Little Rock, Miss.

[73] Assignee: The United States of America as represented by the Secretary of the Navy, Washington, D.C.

[21] Appl. No.: 483,458

[22] Filed: Apr. 8, 1983

[51] Int. Cl.[3] .............................................. B23P 19/04

[52] U.S. Cl. ...................................................... 29/259

[58] Field of Search .................. 29/258, 259, 260, 263

[56] References Cited

U.S. PATENT DOCUMENTS

| | | | |
|---|---|---|---|
| D. 256,544 | 8/1980 | Hintze | 29/259 |
| 975,304 | 11/1910 | Veno . | |
| 1,346,868 | 7/1920 | Wilson . | |
| 1,368,760 | 2/1921 | Schilling . | |
| 1,431,378 | 10/1922 | Derry . | |
| 1,661,938 | 3/1928 | Follingstad . | |
| 2,288,906 | 7/1942 | Kaplan . | |
| 3,076,259 | 2/1963 | Stebbins | 29/259 |
| 3,142,897 | 8/1964 | Davis | 29/259 |
| 3,689,978 | 9/1972 | Kelso | 29/259 |
| 3,908,258 | 9/1975 | Barty | 29/259 |
| 4,372,024 | 2/1983 | Shevada | 29/260 |

FOREIGN PATENT DOCUMENTS

| | | | |
|---|---|---|---|
| 538180 | 5/1955 | Belgium | 29/260 |

*Primary Examiner*—Robert C. Watson
*Attorney, Agent, or Firm*—R. F. Beers; F. I. Gray

[57] ABSTRACT

A jet engine compressor stage puller engages the lip of each disk and spacer section of a jet engine compressor, and the end of the compressor shaft. A guide bar has a central threaded hole through which a bolt is threaded. A cup integral with the bolt engages the end of the compressor shaft. A pair of guide rods pass through slots in the guide bar, the slots being symmetrical about the central threaded hole. Shoes attached to the ends of the guide rods engage the lip of each disk or spacer section to be removed. As the bolt is rotated a force is exerted to pull the shoes upward, and thus loosen the disk and spacer stages without danger of damage to compressor parts or hazard to personnel.

1 Claim, 4 Drawing Figures

JET ENGINE COMPRESSOR STAGE PULLER

BACKGROUND OF THE INVENTION

1. Field of the Invention.

The present invention relates to a tool for applying pulling force, and more particularly to a jet engine compressor stage puller for removing the disk and spacer stages of a jet engine compressor.

2. Description of the Prior Art.

Routine preventive maintenance of jet engines requires the periodic disassembly of the compressor section. The compressor section is a plurality of stages of disks and spacers press-fitted and bolted together on a compressor shaft. In a field maintenance facility when disassembling the compressor, the nuts are removed and the disks and spacers are separated from the next adjoining stage by beating, prying and any other means to overcome the close tolerance between the body bound studs. This method results in potential damage to expensive compressor components, is slow and is a hazard to personnel.

SUMMARY OF THE INVENTION

Accordingly, the present invention provides a jet engine compressor stage puller which engages the lip of each disk and spacer section of a jet engine compressor, and the end of the compressor shaft. A guide bar has a central threaded hole through which a bolt is threaded. A cup integral with the bolt engages the end of the compressor shaft. A pair of guide rods pass through slots in the guide bar, the slots being symmetrical about the central threaded hole. Shoes attached to the ends of the guide rods engage the lip of each disk or spacer section to be removed. As the bolt is rotated a force is exerted to pull the shoes upward, and thus loosen the disk and spacer stages without danger of damage to compressor parts or hazard to personnel.

Therefore, it is an object of the present invention to provide a compressor stage puller to remove compressor disk and spacer stages quickly and safely.

Other objects, advantages and novel features of the present invention will be apparent from the following detailed description when read in conjunction with the appended claims and attached drawing.

DESCRIPTION OF THE PREFERRED EMBODIMENT

Figure 1:
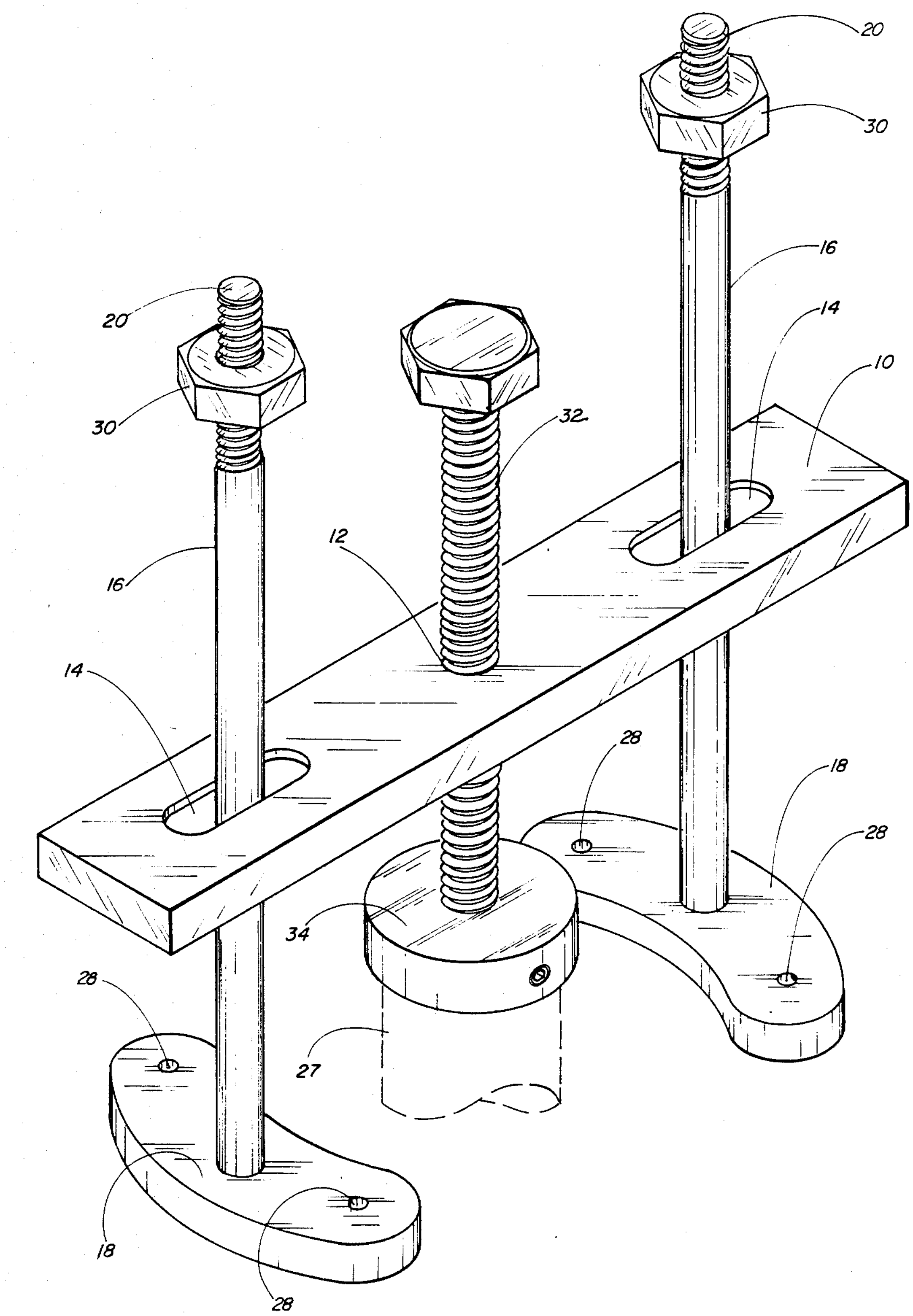
FIG. 1 is a perspective view of a compressor stage puller according to the present invention.
Figure 2:
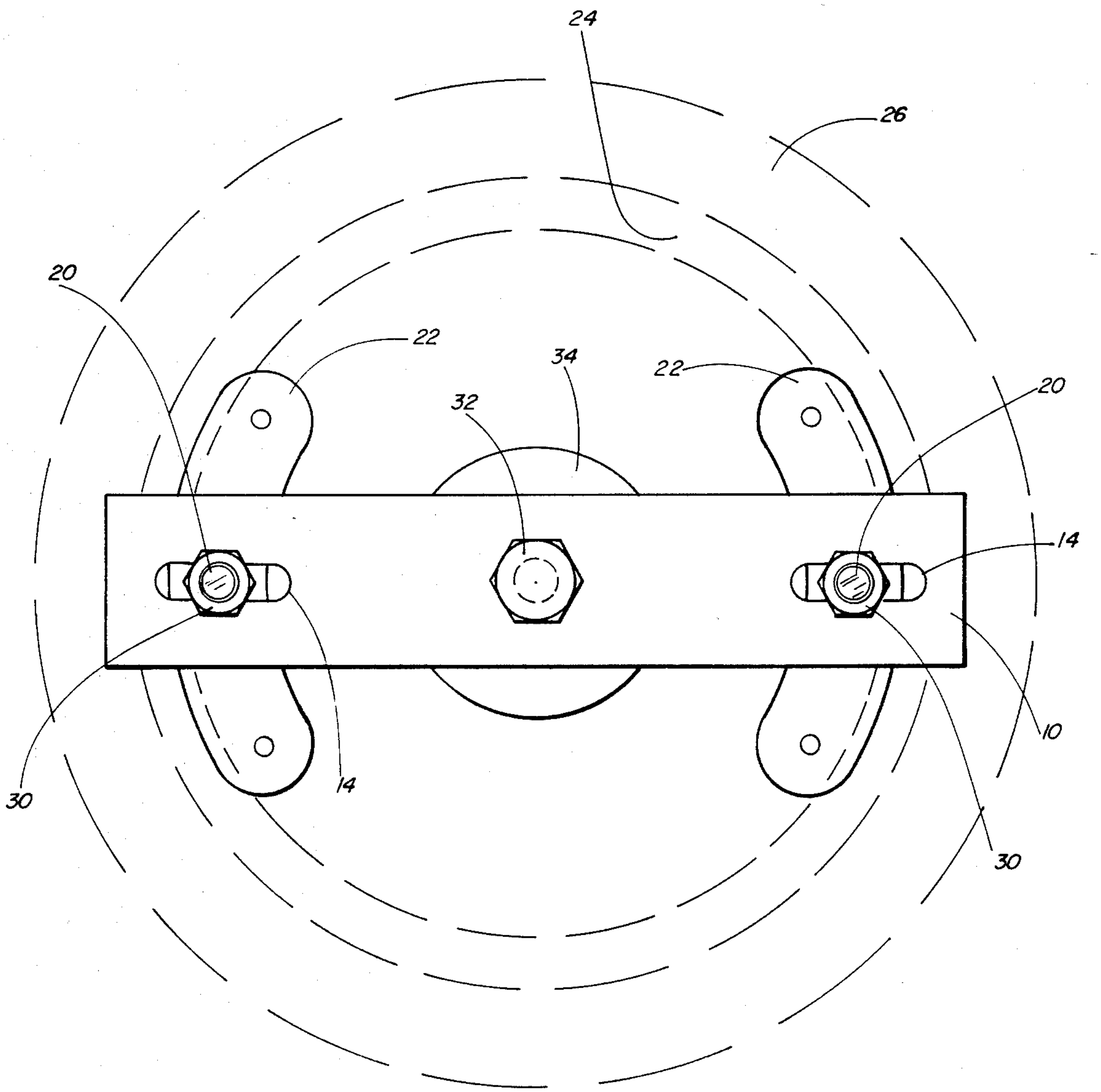
FIG. 2 is a top plan view of the compressor stage puller of FIG. 2.
Figure 3:
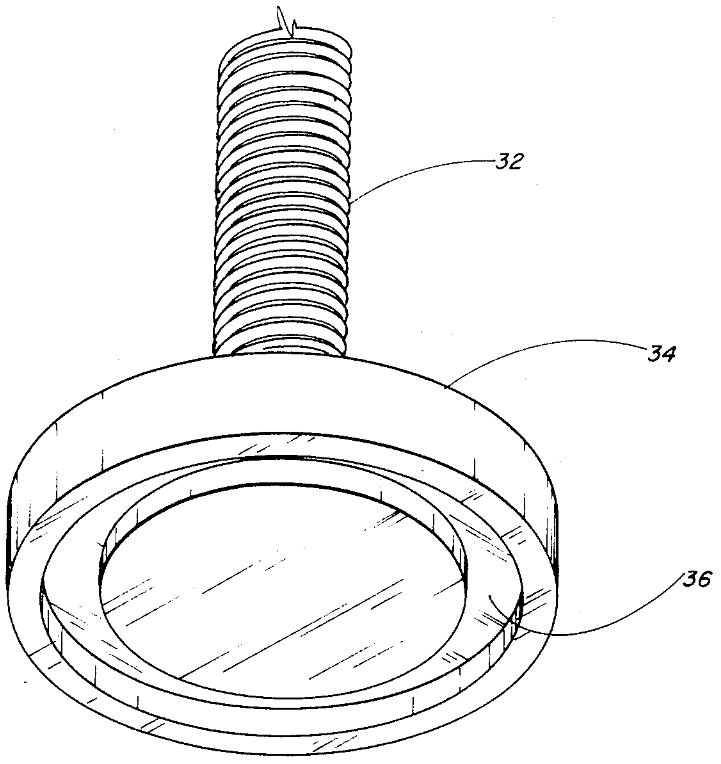
FIG. 3 is a perspective view of the cup for the compressor stage puller.
Figure 4:
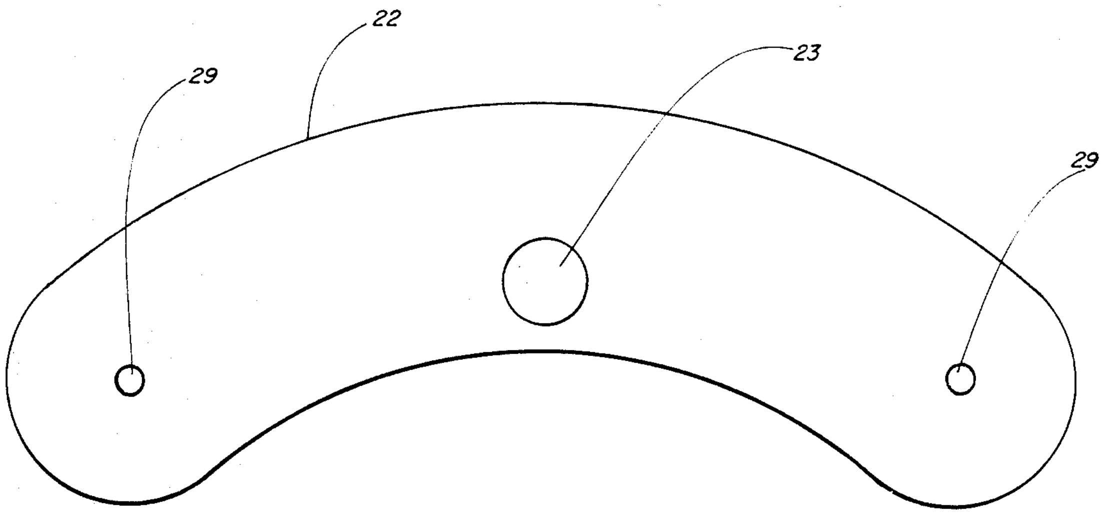
FIG. 4 is a top plan view of a shoe for the compressor stage puller.

Referring now to FIGS. 1–4 a guide bar 10 is shown having a central threaded hole 12 and two slots 14 symetrically disposed about the threaded hole. A pair of guide rods 16 have a shoe 18 attached at one end and are threaded at the opposite end 20. A pair of alternate arcuately shaped shoes 22 each has a central hole 23 so that the shoe may slide down the guide bars 16 and rest on top of the shoe 18. The alternate shoes 22 provide the ability to loosen stages 26 having a greater inside diameter, i.e., the shoes 18 would be used to loosen disk sections while the alternate shoes 22 would be used to loosen spacer sections. The shoes 18/22 fit under the lip 24 of a compressor stage 26, the stage being mounted on a compressor shaft 27. The threaded ends 20 of the guide bars 16 protrude through the slots 14 of the guide bar 10 and have nuts 30 secured thereto. A bolt 32 is threaded through the central threaded hole 12 of the guide bar 10. At the end of the bolt 32 is a cup 34 integral therewith. The cup 34 has a cavity or recess 36 which assures a secure fit with the end of the compressor shaft 27.

In operation the shoes 18/22 are mounted on the guide rods 16, with shoes 22, when used, being attached to shoes 18 by bolts or other suitable means via respective holes 28,29, the holes 28 in shoes 18 being threaded. The cup 34 is placed on the end of the compressor shaft 27 and the guide rods 16 are adjusted along the slots 14 of the guide bar so that the shoes 18/22 fit securely under the lip 24 of the stage 26 to be removed. The guide rods 16 are then secured to the guide bar 10 by the nuts 30. To remove the stage 26 the bolt 32 is tightened so that the cup 34 exerts a downward force against the compressor shaft 27. Since the shaft 27 cannot move, the result is an upward force exerted through the guide rods 16 and shoes 18/22 upon the compressor stage 26. This upward force results in freeing the compressor stage 26 from the subsequent stage so it can be easily removed.

Thus, the present invention provides a jet engine compressor stage puller for removing subsequent compressor stages which are stuck together due to pressure fits of the interstage studs.

What is claimed is:

1. A compressor stage puller comprising:

a guide bar having a central threaded hole and a slot extending though said guide bar and situated symmetrically one on each side of said central threaded hole extending radially from said central threaded hole;

a bolt threaded through said central threaded hole having a cup attached to the end, said cup being configured to securely fit on the end of a compressor shaft;

a guide rod extending through said slot and capable of being moved along said slot, said guide rod having a nut threaded on one end and a base shoe attached to the other end, said base shoe being configurated to fit under the interior diameter of a compressor stage; and means for attaching an alternate shoe to said guide rod, said alternate shoe being arcuately shaped, having a central hole through which said guide rod passes, and having means for attachment to said base shoe so that said alternate shoe is used when necessary to compensate for different interior diameters of successive ones of said compressor stages;

whereby downward movement by said bolt causes said cup to exert downward force on said compressor shaft which in turn results in upward force by said base shoe on said compressor stage to free said compressor stage.

* * * * *